(12) United States Patent
Spitzer et al.

(10) Patent No.: US 7,242,527 B2
(45) Date of Patent: Jul. 10, 2007

(54) OPTICAL SYSTEM USING TOTAL INTERNAL REFLECTION IMAGES

(75) Inventors: Mark B. Spitzer, Sharon, MA (US);
Noa M. Rensing, Newton, MA (US);
Paul M. Zavracky, Newton, MA (US)

(73) Assignee: The Microoptical Corporation, Westwood, MA (US)

( * ) Notice: Subject to any disclaimer, the term of this patent is extended or adjusted under 35 U.S.C. 154(b) by 0 days.

(21) Appl. No.: 11/386,466

(22) Filed: Mar. 22, 2006

(65) Prior Publication Data

US 2007/0047091 A1   Mar. 1, 2007

Related U.S. Application Data

(60) Provisional application No. 60/664,254, filed on Mar. 22, 2005.

(51) Int. Cl.
*G02B 27/14* (2006.01)
*G02B 27/30* (2006.01)
*G09G 5/00* (2006.01)

(52) U.S. Cl. ............................ 359/630; 359/641; 345/8

(58) Field of Classification Search ................ 359/629, 359/630, 631, 633, 636, 641, 738, 739; 345/7–9; 349/11
See application file for complete search history.

(56) References Cited

U.S. PATENT DOCUMENTS

| | | | |
|---|---|---|---|
| 5,886,822 A | 3/1999 | Spitzer | |
| 6,023,372 A | 2/2000 | Spitzer | |
| 6,091,546 A | 7/2000 | Spitzer | |
| 6,204,974 B1 | 3/2001 | Spitzer | |
| 6,349,001 B1 | 2/2002 | Spitzer | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,618,099 B1 | 9/2003 | Spitzer | |
| 6,724,354 B1 | 4/2004 | Spitzer et al. | |
| 6,879,443 B2 | 4/2005 | Spitzer et al. | |

*Primary Examiner*—Alicia M Harrington
(74) *Attorney, Agent, or Firm*—Weingarten, Schurgin, Gagnebin & Lebovici LLP

(57) ABSTRACT

An optical system for a head mounted display includes a light pipe having two parallel surfaces along which modes can travel by total internal reflection. An illumination element allows selection of modes so that the desired modes can be transmitted along the light pipe, either axially or by total internal reflection.

28 Claims, 5 Drawing Sheets

Ray tracing of total-internal reflection multi-mode system

US 7,242,527 B2

OPTICAL SYSTEM USING TOTAL INTERNAL REFLECTION IMAGES

CROSS REFERENCE TO RELATED APPLICATIONS

This application claims the benefit under 35 U.S.C. § 119(e) of U.S. Provisional Patent application No. 60/664,254, filed on Mar. 22, 2005, the disclosure of which is incorporated by reference herein.

STATEMENT REGARDING FEDERALLY SPONSORED RESEARCH OR DEVELOPMENT

This invention was made under U.S. Army Aviation and Missile Command Contract No. N31P4Q-04-C-R280. The government has certain rights to this invention.

BACKGROUND OF THE INVENTION

The propagation of an image through an eyeglass lens or face mask optical plate is known. See, for example, U.S. Pat. No. 5,886,822. Referring to FIG. 1 herein, the light is directed axially, and reflections from the outside surfaces lens are not desirable. Another known embodiment discusses the use of total internal reflection from the surface of the lens or plate in order to reduce the thickness of the lens, or to increase the field of view. See, for example, U.S. Pat. No. 6,384,982.

SUMMARY OF THE INVENTION

An optical system for a head mounted display is provided that allows selection of desired modes for transmission along a light pipe, either axially or by total internal reflection. More particularly, the system includes a light pipe comprising a solid optical element having two parallel surfaces. An image source includes a display element and an illumination element that includes at least one light source. The image source directs light into the light pipe for transmission to the eye of a user.

A collimating system between the illumination element and the display element includes a condensing lens element and an aperture located at a focal length of the condensing lens element. In one embodiment, the aperture and the light source are located along an axis of the condensing lens element so that modes from the illumination element that would be transmittable by total internal reflection off the two parallel surfaces along the light pipe are prevented from entering the light pipe.

In another embodiment, the illumination element includes a further light source, and the collimating system includes a further aperture. The further light source and the further aperture are located off axis of the condensing lens and the display element, so that modes from the illumination element enter the light pipe and are transmitted along the light pipe by total internal reflection of the two parallel surfaces.

In a still further embodiment, the illumination element includes a plurality of light sources, and the collimating system comprises a plurality of apertures, each aperture associated with a light source. In this manner, a plurality of modes can be transmitted to the light pipe, and at least a portion of the modes are transmitted by total internal reflection off the two parallel surfaces of the light pipe. The light sources can be illuminated in sequence to provide different image synchronously. The light sources can be illuminated simultaneously to provide an image with a wide field of view. The optical system can be configured so that the exit pupil of several modes overlap.

DESCRIPTION OF THE DRAWINGS

The invention will be more fully understood from the following detailed description taken in conjunction with the accompanying drawings in which.

DETAILED DESCRIPTION OF THE INVENTION

It is the object of this invention to control the propagation of the light through the lens and to make possible or eliminate total internal reflection (TIR) from the lens surface. This control is attained through design of the back light system used to illuminate the LCD.

We can consider the lens or plate to be a waveguide in which a number of modes can propagate, including the axial mode which does not require any reflection from the waveguide surface. (This is in analogy to a multi-mode optical fiber in which rays can propagate axially or by using reflection at the interface between the fiber core and the cladding.) To control the mode of propagation through the waveguide, it is only necessary to control the light rays incident on the LCD. Rays which are well collimated parallel or at small changes to the optical axis will propagate axially, and rays that pass at larger angles through the LCD may be reflected. The present method allows the modes of the waveguide to be selectively illuminated by addressing the back light. In this way, the field of view of the image may be expanded or contracted.

Figure 1:
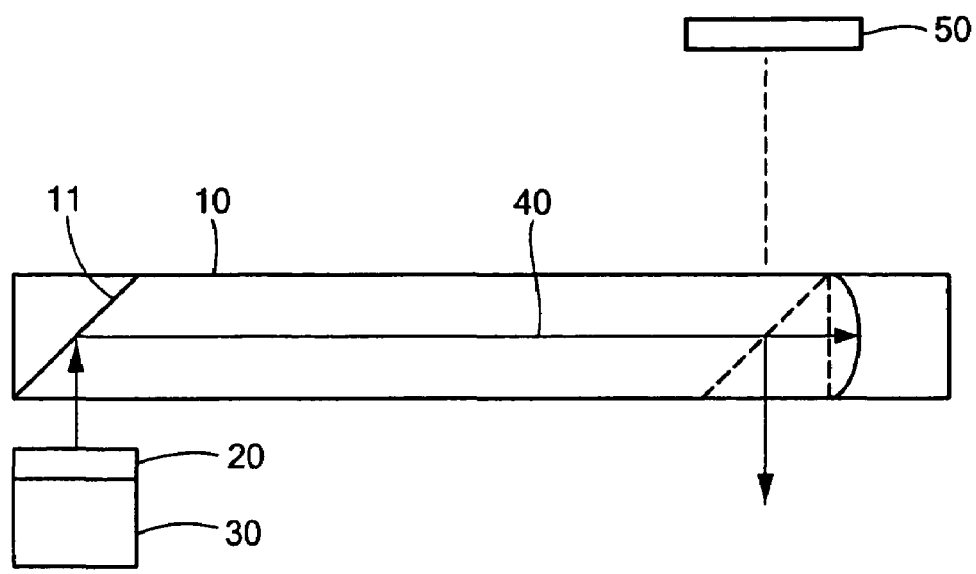
FIG. 1 is a schematic illustration of a prior art optical system.
Figure 2:
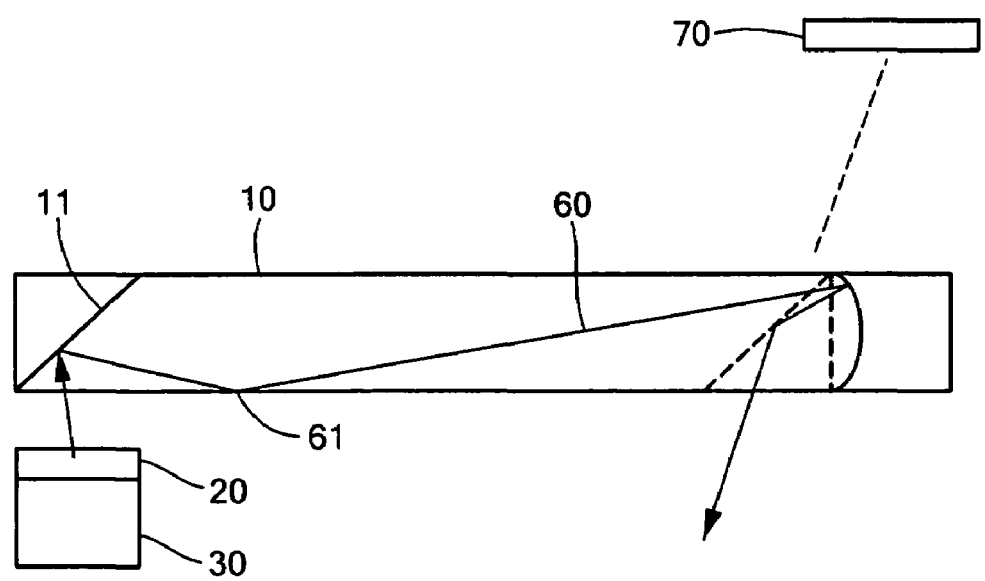
FIG. 2 is a schematic illustration of one mode of total internal reflection of an optical system.

FIG. 1 shows the prior art method of delivering an image through an eyeglass lens to the eye. The light is generated by one or more light emitting diodes housed in a backlight enclosure 30 adjacent to an LCD 20. FIG. 1 shows the axial path of the light 40 through the lens 10 as it propagates to the eye (not shown) to form a virtual image 50. The backlight forms a broad area diffused source which in fact emits light not only in the axial direction, but also in a range of angles. Some of the propagation angles are capable of striking the surface of the lens as they propagate to the eye. FIG. 2 shows an example of such propagation, in which light rays exit the backlight 30 at an angle, pass through the LCD 20 and enter the lens 10, and reflect from the mirror 11. The angles cause the light path 60 to be incident on the surface 61 of lens 10 so as to reflect by TIR. This reflection causes a virtual image 70 which is displaced from the center of the field of view of the user.

Figure 3:
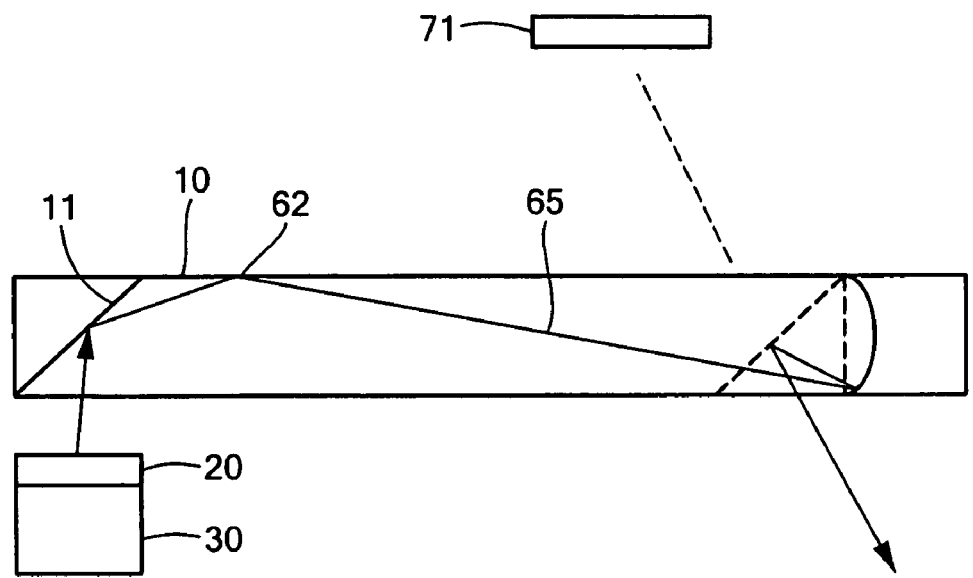
FIG. 3 is a schematic illustration of an opposite mode of total internal reflection of the optical system of FIG. 2.

An opposite mode is possible for rays that exit the back light with an angle in the opposite direction, as shown in FIG. 3. In such a case the light path 65 reflects by TIR from the inside front surface 62 of the lens 10 and results in a virtual image 71 that is displaced to the left of the center of the user's vision.

Figure 4:
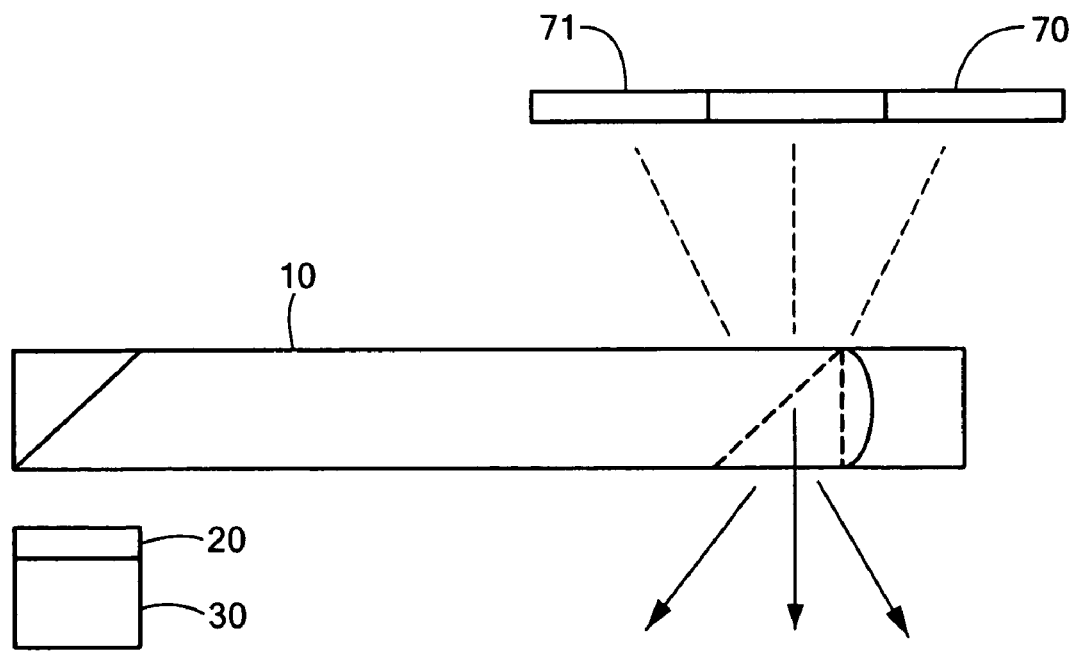
FIG. 4 is a schematic illustration of a variety of virtual images combined in a single optical system.

The case in which light is radiated by the back light diffusely, both along the central axis and in a range of angles, causes a plurality of virtual images, as shown in FIG. 4. If these images contain the same information content, then they are confusing and not useful. In such a case, it is preferred to eliminate the left image 71 and right image 70. However, if each of the three virtual images contain different information, then the three images can be merged to form one large virtual image having a nominal width that is three times the width of the single image.

Figure 5:
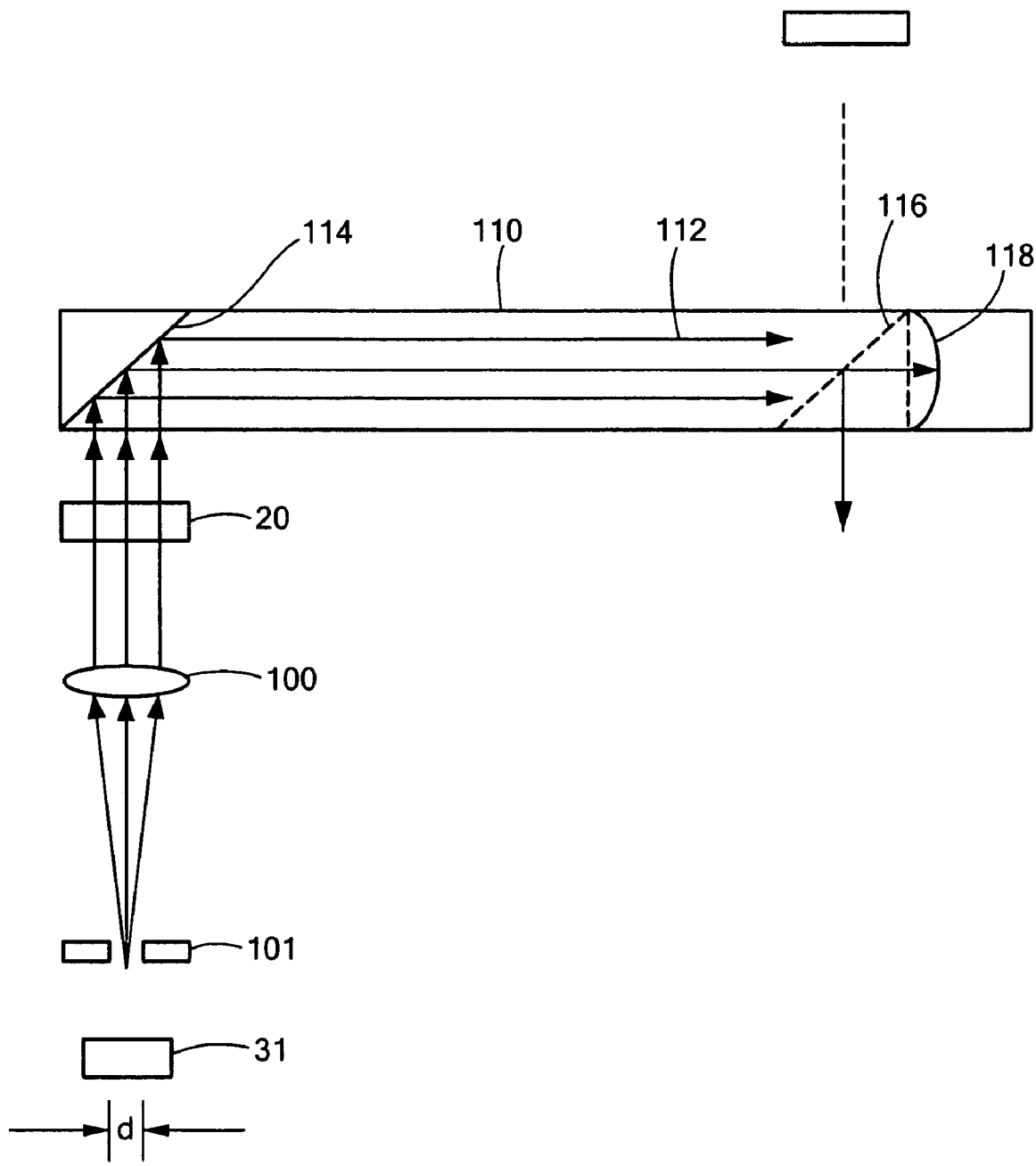
FIG. 5 is a schematic illustration of an optical system to remove lift and right virtual images.

FIG. 5 illustrates how the left and right images can be removed by modification of the back light to form a condensing illuminator. In FIG. 5 we show that the backlight (30 in FIG. 1) has been replaced by a collimated backlight system comprising: an LED 31, a condensing lens 100, and an aperture 101. The aperture would typically be fitted with a diffuser to form a light source of known size and numerical aperture. The aperture 101 is placed at a distance from the condensing lens 100, typically close to or equal to the focal length of the lens. Newton's lens equation shows that this creates an image of the aperture at infinity, meaning that the rays from the aperture are collimated. The degree of collimation depends on the width d of the aperture. Owing to the collimation, rays that would have reflected from the inside of the lens by TIR are removed and only the central virtual image is created. The display viewing optics 110 (in the embodiment illustrated, a light pipe 112 with reflecting surface 114, beam splitter 116, and reflecting surface 118) then re-image the aperture at the exit pupil of the system. Thus this invention provides a method of removing parasitic virtual images in a multi-mode waveguide lens.

Figure 6:
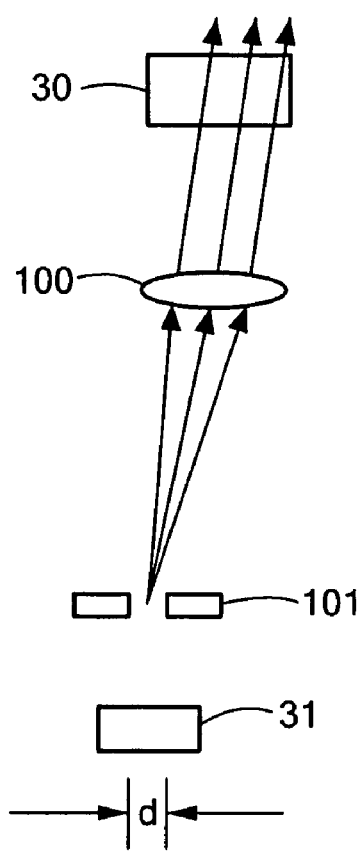
FIG. 6 is a schematic illustration of an optical system in which modes can be selected to illuminate selected virtual images.

FIG. 6 shows the result of moving the aperture 101 off center. In such a case, the rays are collimated, but they propagate at an angle to the axis of the system. This means by positioning the aperture correctly, rays can be selected to propagate in a mode that uses a selected number of TIR bounces to reach the eye of the user, so as to illuminate one virtual image corresponding to the mode.

Figure 7:
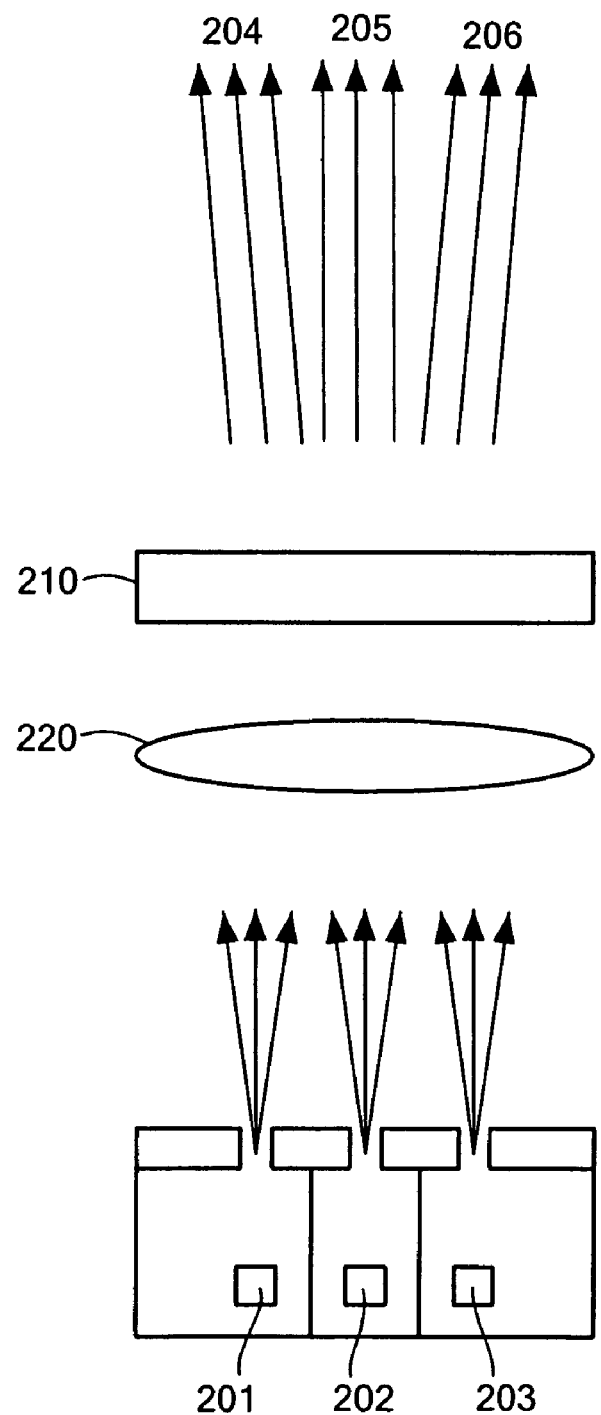
FIG. 7 is a schematic illustration of an optical system in which a variety of total internal reflection modes can be selected.

A system can be constructed in which any number of TIR modes can be selected. In FIG. 7 we illustrate the case in which the center mode is combined with two TIR modes. In this case, three LEDs 201, 202, 203 are combined with three apertures so that three distinct modes are created when the rays pass through lens 220. The central mode 205 propagates through the eyeglass lens or face mask to create the central virtual image. The ray bundle 204 reflects by TIR from the inside surface of the lens (61 in FIG. 2) to form a virtual image on the right (70 in FIG. 2). The ray bundle 206 reflects from the inside surface of the lens (62 in FIG. 3) to form the left virtual image (71 in FIG. 3). The total internal reflection also folds the optical path so that the exit pupils of the three images overlap. If the three LEDS are simultaneously illuminated, three images with equivalent information content are created in the field of view of the user. The left and right images will be seen to be reversed (left to right). However, if the LEDs are sequentially illuminated, and the LCD 210 is provided with three different images synchronously with the LED illumination, the user will see three distinct images. Such LCDs are know as field sequential LCDs and are sold by a number of companies, such as Kopin Corporation, which sells a field sequential Cyberdisplay.

In the preferred embodiment of the invention, the optical system is designed so that exit pupil of the several modes overlaps, so that all the images are visible from a single eye position. Other configuration are possible wherein eye motion is required to view different modes. Optical design techniques my also be used to define the position and size of the light source to eliminate mode-mixing whereby the image of one mode receives stray light while another mode is illuminated. This would result in ghost images and/or loss of contrast. The optical design may be performed by any method known in the art, including first order optical design and manual or computerized ray tracing, for example using commercial optical software such as ZEMAX, CODE V, or OSLO.

Figure 8:
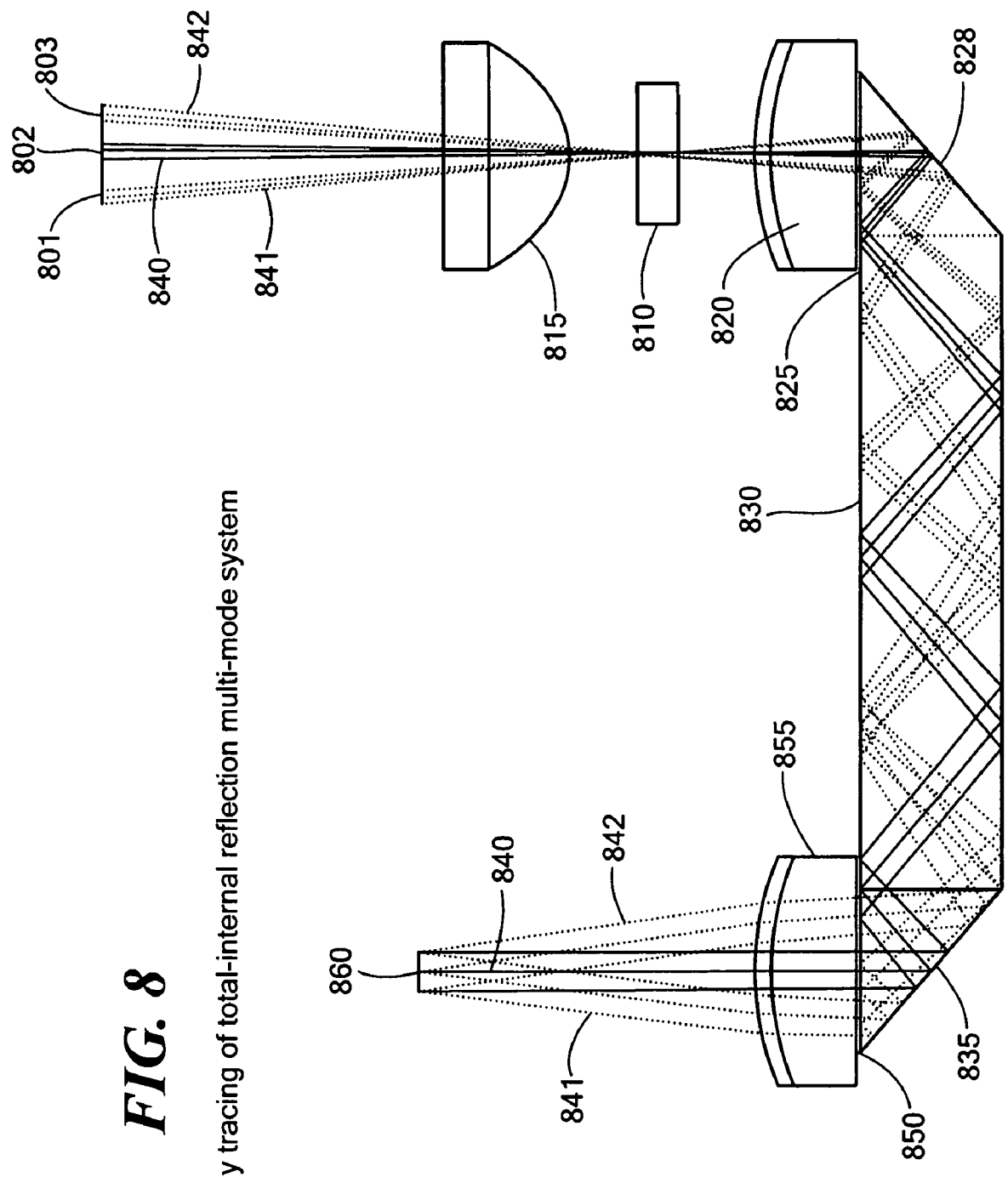
FIG. 8 is a schematic illustration of a further optical system in which a variety of total internal reflection modes can be selected.

FIG. 8 shows a ray trace of a multi-mode design utilizing TIR reflections. Three separate light sources 801, 802, and 803 can be independently pulsed to illuminated the display 810 when the corresponding information is shown. The illustration shows the illumination of the center region of the display, but similar design can be applied to the entire region of the display. The source light is collimated by the condenser lens 815. After passing through the display, the light passes through the field lens 820 and the air gap 825 to enter the light pipe 830. The air gap is necessary to allow for TIR at that interface for the modes that require it. The first reflection at the mirror is at an acute angle, so typically the surface 828 must be made reflective by the application of a reflective coating, cementing of an external mirror, or by any other method known in the art. The rays then propagate through the light pipe using different numbers of TIR reflections. The last reflection is again at an acute angle off of surface 835 which must be made reflective similar to surface 828. Upon exiting the light pipe the light passes a second air gap 850 which allows for TIR reflections at the surface, through the eye lens 855.

The system design must allow for the eye's pupil 860 to be placed at a reasonable eye relief from the last mechanical part. The eye relief must be at least several millimeters and is preferably at least 10 mm and even more preferably between 12 and 35 mm. For a head mounted display it is preferable that all the modes be visible from the same pupil position, so that the user does not have to physically move the display relative to his/her head. As the eye can scan, however, this motion may be used to access different portions of the image of some of the modes.

The number of reflections characterize the mode. In the system shown, the center mode 840 has 7 reflections, of which 5 are TIR reflections off the parallel surfaces of the pipe. The left mode 841 has 9 reflections, of which 7 are TIR. The right mode 842 has 5 reflections, of which 3 are TIR. Certain source locations may illuminate pixels for more than one mode (for example the left pixel of the right image mode and the right pixel of the center mode). To avoid this, the source size must be constrained so that none of the rays from a source for a given mode form a virtual image in a location associated with any other mode.

It can be seen that by proper design of a lens or facemask, the positions and spacings of the virtual images corresponding to the various modes can be controlled. By choosing the lens thickness appropriately, the virtual images can be made to overlap, touch without overlap, or may be made to have a space between them. The images on the LCD can be expanded, contracted, or distorted electronically to adjust the spacing between virtual images which are thus superposed, so as to produce one seamless virtual image. Any number of optical propagation modes can be used to increase the width of the final superposed image, the limiting factor being the speed at which the LCD can be refreshed. For superimposing three images, the LCD should be capable of flashing images at 180 frames per second in order that the user does not see flicker in the image.

Although the above description is of a monocular system, two such systems can be joined to create a binocular or stereo display.

The invention is not to be limited by what has been particularly shown and described, except as indicated by the appended claims.

What is claimed is:

1. An optical system for a head mounted display comprising:
    a light pipe comprising a solid optical element having two parallel surfaces, the light pipe mountable to a head mounted display to direct light to a user's eye;
    an image source comprising a display element and an illumination element comprising a plurality of light sources, the image source disposed to direct light into the light pipe;
    a collimating system between the illumination element and the display element, comprising a condensing lens element and a plurality of apertures each associated with a respective light source and located at or near the focal length of the condensing lens element; and
    at least one aperture and an associated light source are located with respect to the central axis of the condensing lens element and the display element, so that modes from the illumination element enter the light pipe and are transmitted along the light pipe by total internal reflection off the two parallel surfaces.

2. The optical system of claim 1, wherein a plurality of modes are transmitted to the light pipe, and at least a portion of the modes are transmitted by total internal reflection off the two parallel surfaces of the light pipe.

3. The optical system of claim 2, wherein all of the modes are transmitted by at least one total internal reflection off the two parallel surfaces of the light pipe.

4. The optical system of claim 1, wherein the light sources are illuminated in sequence, and the display element is updated in a synchronous manner to provide a distinct virtual image for each of the modes.

5. The optical system of claim 1, wherein the virtual images for the different modes are illuminated in a sequence too rapid for a user to detect, creating a virtual image having a field of view wider than a virtual image created by illumination of a single light source alone.

6. The optical system of claim 1, wherein three modes are used and the three modes are sequentially illuminated at individual frequencies between 60 and 80 times per second and wherein the display element is synchronously refreshed at between 180 and 240 times per second.

7. The optical system of claim 1, wherein exit pupils of several modes overlap, whereby all images are visible from a single eye position.

8. The optical system of claim 1, wherein exit pupils of several modes do not overlap, whereby eye motion relative to the optical system is required to view different modes.

9. The optical system of claim 1, wherein at least one aperture and associated light source are located along the central axis of the condensing lens element and the display element.

10. The optical system of claim 1, wherein at least one aperture and associated light source are located off the central axis of the condensing lens element and the display element.

11. The optical system of claim 1, further comprising a field lens element to direct light from the display element into an entrance surface of the light pipe.

12. The optical system of claim 11, further comprising an air gap between the field lens element and the entrance surface of the light pipe, wherein the gap allows total internal reflection at locations between the field lens element and the light pipe.

13. The optical system of claim 1, wherein the light pipe comprises an elongated element, an entrance surface adjacent one end, and exit surface adjacent another end, a reflecting surface near the entrance surface to direct entering light rays along the elongated element between the two parallel surfaces, a reflecting surface near the exit surface to direct light rays out of the light pipe through the exit surface.

14. The optical system of claim 1, further comprising an eye lens element to direct light from an exit surface of the light pipe to the user's eye.

15. The optical system of claim 14, further comprising an air gap between the eye lens and the exit surface of the light pipe, wherein the gap allows total internal reflection at locations between the eye lens element and the light pipe.

16. An optical system for a head mounted display comprising:
    a light pipe comprising a solid optical element having two parallel surfaces, the light pipe mountable to a head mounted display to direct light to a user's eye;
    an image source comprising a display element and an illumination element comprising at least one light source, the image source disposed to direct light into the light pipe; and
    a collimating system between the illumination element and the display element, comprising a condensing lens element and an aperture located at a focal length of the condensing lens element, the aperture and the light source further located along an axis of the condensing lens element so that modes from the illumination element transmittable by total internal reflection off the two parallel surfaces along the light pipe are prevented from entering the light pipe.

17. The optical system of claim 16, wherein the illumination element comprises a further light source, and the collimating system includes a further aperture, and the further light source and the further aperture are located off the central axis of the condensing lens and the display element, so that modes from the illumination element enter the light pipe and are transmitted along the light pipe by total internal reflection off the two parallel surfaces.

18. The optical system of claim 16, wherein the illumination element comprises a plurality of light sources, and the collimating system comprises a plurality of apertures, each aperture associated with a light source, whereby a plurality of modes are transmitted to the light pipe, and at least a portion of the modes are transmitted by total internal reflection off the two parallel surfaces of the light pipe.

19. The optical system of claim 18, wherein the light sources are illuminated in sequence, and the display element is updated in a synchronous manner to provide a distinct virtual image for each of the modes.

20. The optical system of claim 18, wherein the virtual images for the different modes are illuminated in a sequence too rapid for the use to detect, creating a virtual image having a field of view wider than a virtual image created by illumination of a single light source alone.

21. The optical system of claim 18, wherein three modes are used and the three modes are sequentially illuminated at individual frequencies between 60 and 80 times per second and wherein the display element is synchronously refreshed at between 180 and 240 times per second.

22. The optical system of claim 18, wherein exit pupils of several modes overlap, whereby all images are visible from a single eye position.

23. The optical system of claim 18, wherein exit pupils of several modes do not overlap, whereby eye motion relative to the optical system is required to view different modes.

24. The optical system of claim 18, further comprising a field lens element to direct light from the display element into an entrance surface of the light pipe.

25. The optical system of claim 24, further comprising an air gap between the field lens element and the entrance surface of the light pipe, wherein the gap allows total internal reflection at locations between the field lens element and the light pipe.

26. The optical system of claim 18, further comprising an eye lens element to direct light from an exit surface of the light pipe to the user's eye.

27. The optical system of claim 26, further comprising an air gap between the eye lens and the exit surface of the light pipe, wherein the gap allows total internal reflection at locations between the eye lens element and the light pipe.

28. The optical system of claim 16, wherein the light pipe comprises an elongated element, an entrance surface adjacent one end, and exit surface adjacent another end, a reflecting surface near the entrance surface to direct entering light rays along the elongated element between the two parallel surfaces, a reflecting surface near the exit surface to direct light rays out of the light pipe through the exit surface.

* * * * *